US011949566B2

(12) United States Patent
Liu et al.

(10) Patent No.: US 11,949,566 B2
(45) Date of Patent: Apr. 2, 2024

(54) METHODS, SYSTEMS, AND COMPUTER READABLE MEDIA FOR TESTING A SYSTEM UNDER TEST USING A PROCESSING NODE COMMUNICATIONS MODEL

(71) Applicant: Keysight Technologies, Inc., Santa Rosa, CA (US)

(72) Inventors: Winston Wencheng Liu, Woodland Hills, CA (US); Dan Mihailescu, Mogosoaia (RO); Matthew R. Bergeron, Sunol, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/903,210

(22) Filed: Sep. 6, 2022

(65) Prior Publication Data
US 2024/0080244 A1 Mar. 7, 2024

(30) Foreign Application Priority Data
Sep. 2, 2022 (RO) .............................. a 2022 00539

(51) Int. Cl.
G06F 15/173 (2006.01)
H04L 41/14 (2022.01)
H04L 67/10 (2022.01)

(52) U.S. Cl.
CPC ............. *H04L 41/14* (2013.01); *H04L 67/10* (2013.01)

(58) Field of Classification Search
CPC .............................. H04L 41/14; H04L 67/10
See application file for complete search history.

(56) References Cited

U.S. PATENT DOCUMENTS

| 11,062,047 | B2 | 7/2021 | Mukherjee et al. | |
| 11,323,326 | B2 | 5/2022 | Kommula et al. | |
| 2013/0160016 | A1* | 6/2013 | Gummaraju | G06F 9/5044 718/102 |
| 2014/0047079 | A1 | 2/2014 | Breternitz et al. | |
| 2014/0298335 | A1* | 10/2014 | Regev | G06F 11/261 718/1 |

OTHER PUBLICATIONS

"AI Chip (ICs and IPs)," GitHub, https://basicmi.github.io/AI-Chip/, pp. 1-29 (2022).

* cited by examiner

*Primary Examiner* — Padma Mundur

(57) ABSTRACT

Methods, systems, and computer readable media for testing a system under test (SUT). An example system includes a distributed processing node emulator configured for emulating a multi-processing node distributed computing system using a processing node communications model and generating intra-processing node communications and inter-processing node communications in the multi-processing node distributed computing system. At least a portion of the inter-processing node communications comprises one or more messages communicated with the SUT by way of a switching fabric. The system includes a test execution manager configured for managing the distributed processing node emulator to execute a pre-defined test case, monitoring the SUT, and outputting a test report based on monitoring the SUT during execution of the pre-defined test case.

16 Claims, 8 Drawing Sheets

ME THODS, SYSTEMS, AND COMPUTER READABLE MEDIA FOR TESTING A SYSTEM UNDER TEST USING A PROCESSING NODE COMMUNICATIONS MODEL

PRIORITY CLAIM

This application claims the priority benefit of Romanian Patent Application Serial Number a 2022 10055, filed Sep. 2, 2022, the disclosure of which is incorporated herein by reference in its entirety.

TECHNICAL FIELD

The subject matter described herein relates to network testing. More specifically, the subject matter relates to methods, systems, and computer readable media for testing a system under test using a processing node communications model.

BACKGROUND

Optimizing the performance of machine learning can include selecting the right hardware to train and deploy a model. Graphics processing units, or GPUs, are specialized processing units designed to accelerate graphics rendering for gaming. GPUs are configured to efficiently parallelize massive distributed computational processes, and GPUs have successfully been applied to applications beyond graphics rendering, including machine learning applications.

In a multi-GPU setup for machine learning, computation can be distributed, e.g., using data parallelism or model parallelism. There are different strategies for orchestrating and merging results. In some cases, a process is specified to run synchronously (i.e., wait for each replica to complete each step) or asynchronously. GPUs can be grouped together, for example, in a data center architecture. Testing the communications capabilities of groups of GPUs in such an architecture, however, can be challenging and can involve building out expensive physical computing systems.

Accordingly, a need exists for methods, systems, and computer readable media for testing a system under test using a processing node communications model.

SUMMARY

Methods, systems, and computer readable media for testing a system under test (SUT). An example system includes a distributed processing node emulator configured for emulating a multi-processing node distributed computing system using a processing node communications model; generating intra-processing node communications in the multi-processing node distributed computing system; and generating inter-processing node communications in the multi-processing node distributed computing system, wherein at least a portion of the inter-processing node communications comprises one or more messages communicated with the SUT by way of a switching fabric. The system includes a test execution manager configured for managing the distributed processing node emulator to execute a pre-defined test case, monitoring the SUT, and outputting a test report based on monitoring the SUT during execution of the pre-defined test case.

An example method includes emulating a multi-processing node distributed computing system using a processing node communications model; generating intra-processing node communications in the multi-processing node distributed computing system; generating inter-processing node communications in the multi-processing node distributed computing system, wherein at least a portion of the inter-processing node communications comprises one or more messages communicated with the SUT by way of a switching fabric; executing a pre-defined test case in the multi-processing node distributed computing system; monitoring the SUT; and outputting a test report based on monitoring the SUT during execution of the pre-defined test case.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for testing a system under test (SUT). A test system (e.g., one or more computing platforms, devices, or nodes) can be configured for emulating data flows and evaluating the performance of disaggregated heterogenous compute systems. The test system can include test traffic generation and integrated monitoring capability for executing test scripts and producing and outputting test reports.

Figure 1:
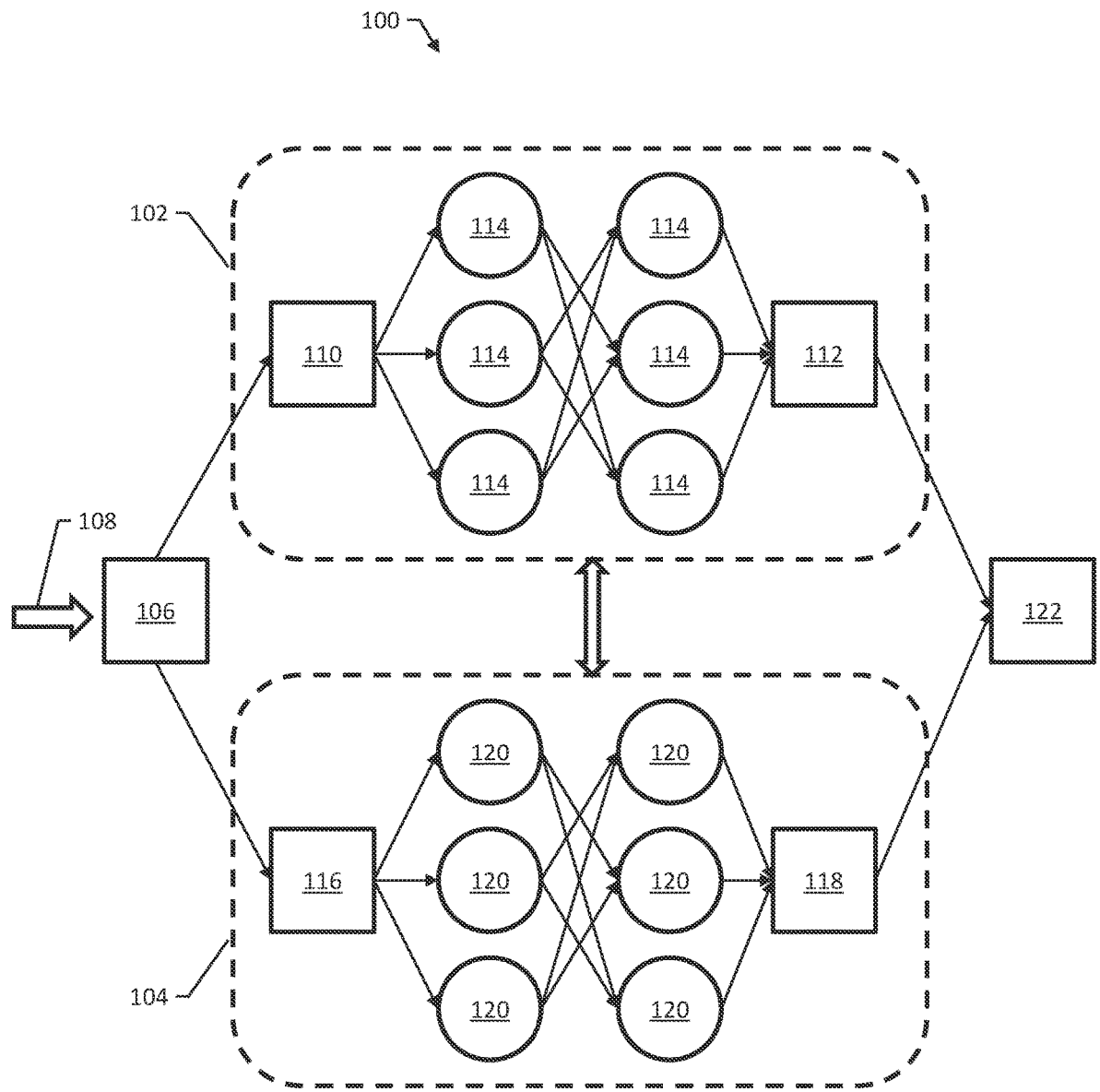
FIG. 1 is a dataflow diagram illustrating an example distributed GPU node architecture.

FIG. 1 is a dataflow diagram illustrating an example distributed GPU node architecture 100. FIG. 1 shows a first GPU node 102 and a second GPU node 104. Each of the GPU nodes 102 and 104 is an example of a processing node. The term "processing node" is used in this document to describe a computing system having one or more CPUs or one or more GPUs or both, or other types of compute nodes configured to communicate both internally and externally.

The GPU nodes 102 and 104 shown in FIG. 1 are configured similarly in that they both include central processing unit (CPU) and GPU compute nodes, memory, and communications hardware to support intra-processing node communications and inter-processing node communications. The GPU node architecture 100 includes a coordinator node 106 (e.g., implemented on a CPU) that receives a computing job 108 (e.g., an artificial intelligence (AI) or machine learning (ML) task) and distributes computing processes of the job 108 to the GPU nodes 102 and 104.

The coordinator node 106 is configured for orchestrating and/or scheduling the distribution of computing tasks, e.g., to hardware accelerators for an AI/ML task. In some examples, the coordinator node 106 communicates with the GPU nodes 102 and 104 via a management network to separate some data flows (e.g., emulated data flows as described further below) from coordination messages. The distribution of work can be from, e.g., partitioning of the working data set, the type of computing to be performed on the partitioned data set, and the final combining of the computed results from the GPUs 114 and 120.

The coordinator node 106 can send messages instructing the GPU nodes 102 and 104 on how to interact with each other or other GPU nodes for creating communication patterns, e.g., send/receive 1 GB to/from nodes 2, 3, and 4 and send back 100 MB. The coordinator node 106 can also send synchronization messages to emulate communication patterns that emulate parallel traffic.

The first GPU node 102 includes an ingress CPU 110, a number of GPUs 114, and an egress CPU 112. The second GPU node 104 also includes an ingress CPU 116, a number of GPUs 120, and an egress CPU 118. The egress CPUs 112 and 118 can communicate with another coordinator node 122.

A message received at the first GPU node 102 (or the second GPU node 104) can be first processed by the ingress CPU 110, which invokes signaling between the CPU 110 and one or more of the GPUs 114. The message can be, for example, a message containing a command/instructions associated with a hardware acceleration processing task, such as a computing operation related to the training of an artificial neural network. Examples of the types of signaling/messaging between the CPU 110 and the GPUs 114 can include, e.g., control and data plane messages associated with a hardware acceleration processing/computing task.

In operation, to complete the job 108, the GPUs 114 of the first GPU node 102 communicate with each other using intra-processing node communications, and the GPUs 120 of the second GPU node 104 communicate with each other using intra-processing node communications. The GPUs 114 of the first GPU node 102 may also communicate with the GPUs 120 of the second GPU node 104 using inter-processing node communications.

The GPUs 114 and 120 can be connected internally via an internal communications bus, e.g., a PCIe bus. The GPUs 114 and 120 can be configured for inter-processing node communications by way of an external network interface, e.g., an Ethernet link.

Figure 2:
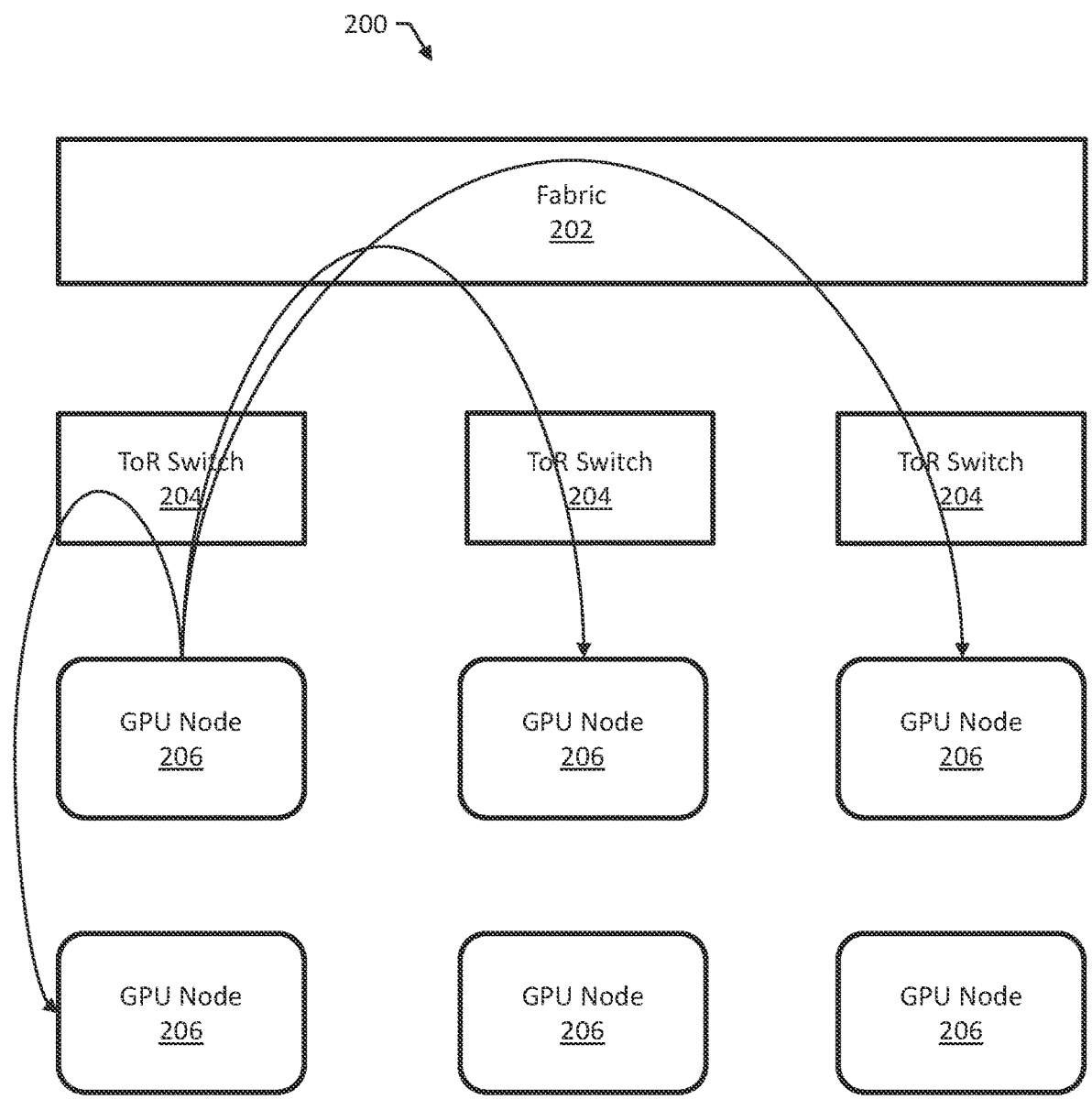
FIG. 2 is a block diagram of an example deployment of GPU nodes 206 within a data center environment.

FIG. 2 is a block diagram of an example deployment of GPU nodes 206 within a data center environment 200. The data center environment 200 includes a switching fabric 202 that enables inter-GPU node communications. Results of the GPU processing may be handled by/provided to the same internal CPU core and subsequently the same coordinator node.

As shown in FIG. 2, the GPUs communicate within racks (depicted as vertical columns in FIG. 2) by top of rack (ToR) switches 204. The ToR switches 204 can be used for communications within a rack or to communicate to other racks by way of the fabric 202. Inter-GPU node communications can be carried, e.g., on Ethernet or other appropriate data communications networks.

Figure 3A:
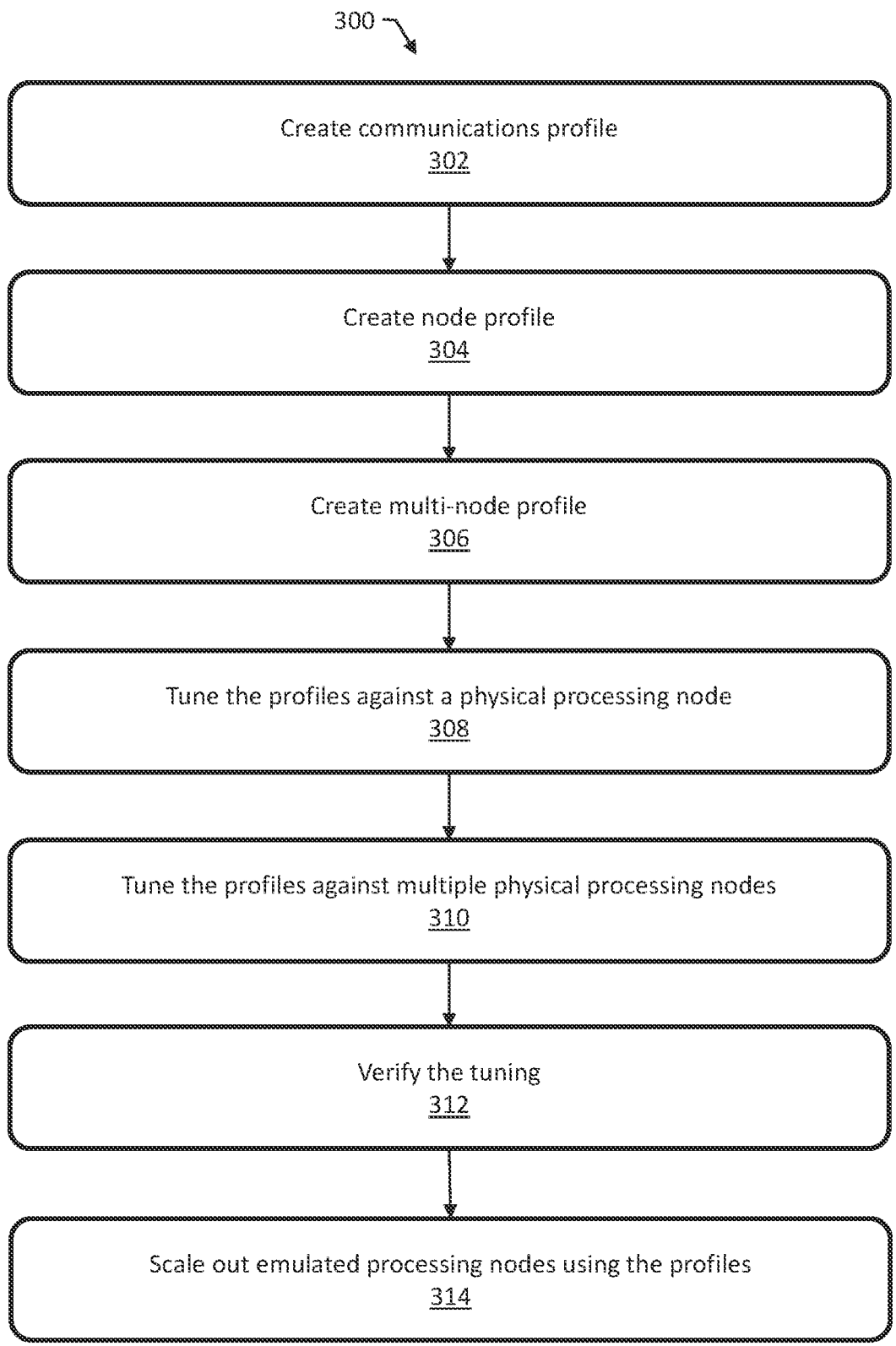
FIG. 3A is a flow diagram of an example method 300 for an operational sequence for testing a system under test using a processing node communications model.

FIG. 3A is a flow diagram of an example method 300 for an operational sequence for testing a system under test using a processing node communications model, e.g., by emulating a multi-processing node distributed computing system using a processing node communications model. The operational sequence can be performed by a performance evaluation system receiving user input from a system user.

It will be appreciated that contemplated embodiments of the present invention could be configured to characterize, emulate and test SUTs that include infrastructure processing units (IPUs) and data processing units (DPUs) that securely accelerate and manage infrastructure functions in a data center via programmable hardware.

In general, the performance evaluation can include some or all of the following functions:
1. Compute resource characterization/model building (e.g., via microbenchmarking, via MLPerf, or other appropriate tools)
2. Dataflow emulation generation & tuning (i.e., using real workloads for target tasks such as machine learning tasks)
3. DUT/SUT performance evaluation/testing using physical DUT/SUT at scaled emulation The method 300 proceeds, generally, by modeling a single physical processing node first, then modeling multiple physical processing nodes, and then modeling multiple physical processing nodes with a data communications fabric. For purposes of illustration, the method 300 will be described with respect to GPU nodes as the physical processing nodes.

The method 300 includes creating a communications profile (302). For example, a system user can instrument a GPU application framework to tap and/or emit communication events.

The method 300 includes creating a node profile (304). For example, a system user can run microbenchmarks (or other appropriate tools) on a physical GPU node and use the measured parameters to create the node profile.

The method 300 includes creating a multi-node profile (306). For example, microbenchmarks can be run against two or more physical GPU nodes, which can be connected to a data communications fabric (physical or emulated).

The method 300 includes tuning the profiles against a physical processing node (308). Tuning can include repeatedly running microbenchmarks (or other appropriate tools), measuring data from a physical GPU node executing a target application, and adjusting the profiles against the measured data.

The method 300 includes tuning the profiles against multiple physical processing nodes (310). Tuning can include repeatedly running microbenchmarks (or other appropriate tools), measuring data from two or more physical GPU nodes (and optionally a physical or emulated fabric) executing a target application, and adjusting the profiles against the measured data.

The method 300 includes verifying the tuning (312). For example, verifying the tuning can include emulating one or more GPU nodes using the profiles while executing a target application on one or more physical GPU nodes (and optionally a physical or emulated fabric) and comparing measured data against measured data from creating and tuning the profiles. Verifying the tuning can include using co-emulation, e.g., one physical GPU node and one emulated GPU node using the profiles, executing a target workload.

The method 300 includes scaling out emulated processing nodes using the profiles (314). The emulated GPU nodes can be used for testing physical GPU nodes, e.g., by executing a test script and executing a target application. In some examples, emulated GPU nodes are scaled out with available physical GPU nodes for GPU application/workload prediction at higher scale, which can be useful for testing devices and systems while reducing requirements for potentially expensive physical computing hardware.

The method 300 can be performed using a distributed computing performance evaluation system configured for actively controlling and probing one or more components of a distributed computing SUT to characterize the components and/or a distributed computing system comprising the components. A distributed computing system can include, for example, collections of distributed computing resources, such as CPUs, GPUs, field programmable gate arrays (FP-GAs), application specific integrated circuits (ASICs), as well as switching fabric and/or interconnect buses that facilitates the interconnection of these resources.

The examples described in this document show scalable compute systems whose components include CPU units, GPU units, GPU nodes (e.g., network elements comprised of interconnected CPU units+GPU units) and switching fabrics (e.g., for interconnecting GPU nodes). In some other examples, the systems and methods described in this document can be used to characterize, emulate, and evaluate the performance of scalable compute systems that include other forms of distributed hardware acceleration (e.g., which involve FPGA- or ASIC-based compute resources).

A GPU or GPU node is an example of a type of hardware accelerator (HWA) for AI/ML, and the system and methods described in this document can be used for testing any appropriate type of hardware AI/ML accelerators. Groups of compute nodes may be either homogenous (i.e., all compute nodes in the group are based on the same/similar atomic HWA architectures) or heterogenous (i.e., compute nodes in the group may be based on different atomic HWA architectures). Compute nodes in a group can be interconnected via external, inter-node interfaces (e.g., Ethernet LAN/WAN, other data center switching fabric).

Figure 3B:
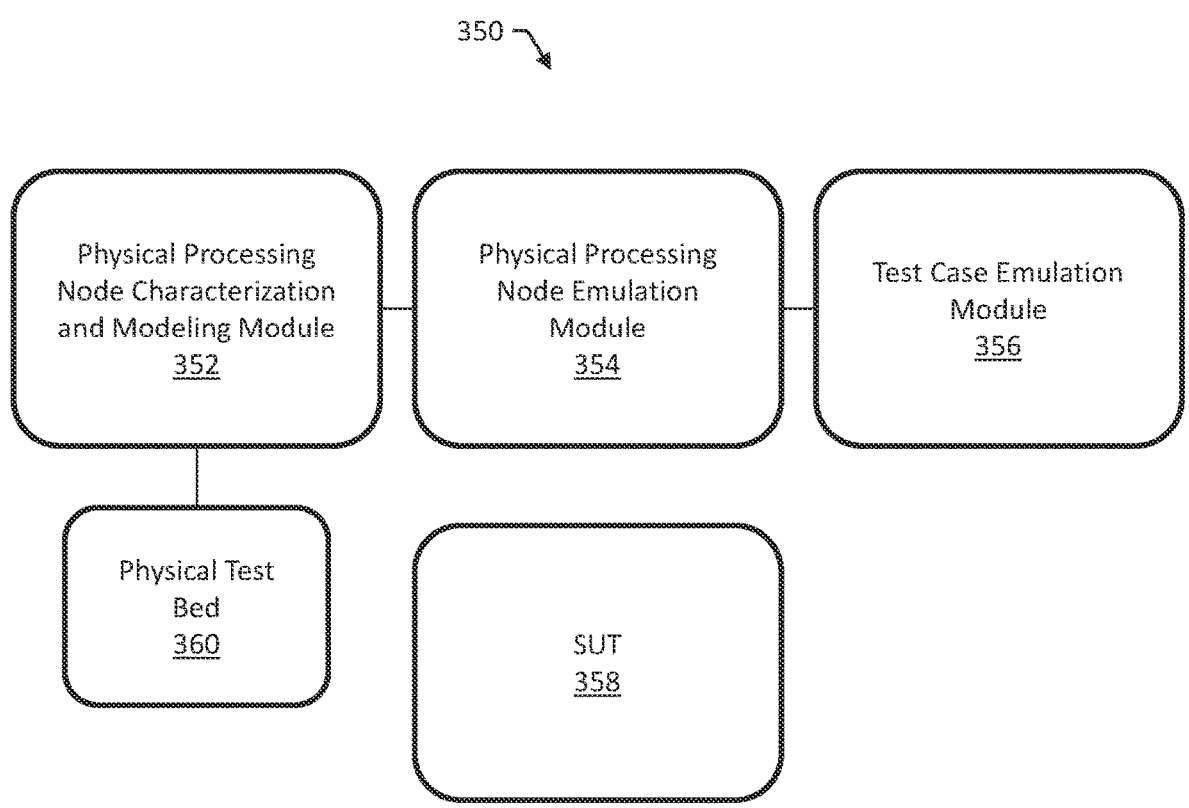
FIG. 3B is a block diagram of an example performance evaluation system.

FIG. 3B is a block diagram of an example performance evaluation system 350. The system 350 is configured for testing a device or system under test (SUT) 358.

The system 350 includes a physical processing node characterization and modeling module 352, a physical processing node emulation module 354, and a test case emulation module 356. The modules 352, 354, and 356 can be implemented on a system of one or more computers and supporting measurement hardware.

A physical processing node may have external ingress/egress interfaces for communicating with an offload-service-requesting remote network element (e.g., an application server, a database server, etc.), as well as one or more inter-node interfaces for communicating task (e.g., hardware acceleration for machine learning) related dataflows with other physical processing nodes within a data center.

The physical processing node characterization and modeling module 352 includes a physical test bed 360 that configured host one or more compute resources (e.g., GPU nodes) and to facilitate the monitoring of both external and internal communications, operations and performance metrics of the hosted compute resource(s). Such monitoring may be accomplished via external probes (network taps, etc.) as well as internal probes and monitoring agents (e.g., k-probes, uprobes, eBPF, etc.) associated with the hosted compute resources. In some examples, power consumption of the physical processing nodes is also monitored via power measurement probes/instrumentation, or power consumption may be inferred from other operational metrics that are observed via probes/monitoring agents.

The physical test bed 360 may include probes that can monitor physical GPU operational performance metrics, intra-GPU node/internal GPU bus performance metrics, inter-GPU communication performance, including but not limited to:
 GPU utilization (similar to CPU utilization)
 data in/out of GPU
 throughput in/out of GPU
 GPU bandwidth (e.g. PCI, NVlink, etc. bandwidth)
 PCI bus messages, message sizes, message sizes distribution
 GPU Power Usage•GPU Temperature
 GPU Memory Usage Compute resource characterization may be performed in a variety of ways. In one hierarchical approach, a single arbitrarily defined "atomic" unit of a compute resource (e.g., a GPU node) is first placed in the physical test bed 360. During an initial characterization stage of operation, the atomic compute resource configured within the physical test bed 360 is the performance evaluation system's DUT.

During this stage, the performance evaluation system 350 facilitates the execution of a microbenchmark task(s) on an atomic physical compute resource DUT. The monitored DUT data is then collected from the physical test bed 360 via probes/agents and used to characterize the atomic unit of compute resource under the applied benchmark workload conditions. In such an "atomic" test bed configuration, only intra-node messaging/communications will be observed and recorded. This step may be repeated for different microbenchmark workloads until the atomic unit of compute resource is sufficiently characterized.

Next, two (or more) "atomic" units of a compute resource (e.g., two GPU nodes) are placed in the physical test bed 360 and connected via an external link or switching fabric. In this stage, the group of GPU nodes and the interconnecting link(s) or switching fabric are considered to be the performance evaluation system's polyatomic SUT.

The performance evaluation system 350 facilitates the execution of a microbenchmark task(s) on the group of interconnected physical processing nodes in the physical test bed 360. The monitored SUT data is then collected from the physical test bed 360 via probes/agent and used to characterize the polyatomic group of compute resource under the applied benchmark workload conditions.

In such a multi-node test bed configuration, intra-node and inter-node messaging/communications will be observed and recorded. This step may be repeated for different microbenchmark workloads until the polyatomic group of compute resource is sufficiently characterized.

The basic characterization process described above may be performed for polyatomic groups of compute resources of varying types (e.g., vendor X GPU node, vendor Y GPU node, etc.), sizes (i.e., numbers of nodes) and organizational structures/topologies (e.g., full mesh connectivity, etc.). The physical test bed 360 may also be configured to include data center switching fabric elements, which can also be instrumented, monitored and modeled to create a switching fabric emulation component.

The compute resource characterization data that is collected is then analyzed and used to construct an emulation model of the characterized compute resource(s) in the physical test bed 360. The emulation model is constructed such that the physical processing node emulation module 354 can use the model to generate/emulate realistic internal data flows/data flow graphs associated with the modeled compute resource (e.g., a single GPU node, multiple interconnected GPU nodes, etc.) and its performance of one or more processing tasks, e.g., hardware acceleration for machine learning. An internal data flow can include, for example:

1. The exchange of messages/communications/data that occur between components (e.g., GPU units/chips, CPU units/chips, FPGA units/chips, ASIC units/chips, etc.) within a single "atomic" hardware device (e.g., GPU node) associated with a compute resource; and
2. The exchange of messages/data/results that occur between multiple "atomic" hardware devices (e.g., multiple interconnected GPU nodes) associated with the compute resource(s) (i.e., data exchanged via an inter-node interface).

During subsequent stages of operation of the performance evaluation system 350, these modeled internal data flows may subsequently be used in the performance evaluation of a SUT, where the SUT is comprised, at least in part, of emulated compute resources and/or switching fabric resources.

Once an initial emulation model (e.g., compute resource+ switching fabric, etc.) is constructed (e.g., via benchmarking with MLPerf dataset(s), etc.), the initial emulation model may be tuned to increase robustness and fidelity via any number of techniques. Such tuning may involve the adjustment of various compute resource model and/or switching fabric parameters.

One such tuning technique involves directing the performance evaluation system to facilitate the processing of a real HWA offload task by physical compute resources hosted in the test bed. The associated compute resource (and switching fabric) performance is monitored and logged, including internal data flows (i.e., intra- and inter-node data flows, events, communications, etc.). The same real HWA offload task is then performed by an emulation engine that is provisioned with the emulation model. The emulation engine is adapted to record/log similar internal data flow metrics and emulated compute resource operational performance metrics.

Performance metric data associated with the physical test bed and the emulation model is then compared (e.g., via an automated process or a manual process) and emulation model parameter adjustments (e.g., adjustments to the emulated GPU component models, adjustments to the emulated switching fabric models, or adjustments to both) are determined.

Once again, emulation parameters may include parameters associated with emulated compute resource components and/or emulated interconnecting switching fabric components. Once the emulation model parameter adjustments have been made, the tuning process described above may be iteratively repeated until an end condition is reached, e.g., the emulation model is sufficiently accurate/acceptable.

In summary, the performance evaluation system 350 can be configured to perform both 1) characterization and modeling and 2) scaled emulation performance evaluation.

Characterization and Modeling
Place DUT/SUT in a physical testbed
Use test system to apply stimulus traffic to the physical DUT/SUT
Monitor internal and external behavior(s) of the physical DUT/SUT (e.g., intra-node data flows, inter-node data flows, resource performance metrics (e.g., mem usage, processor utilization, power utilization, etc.)
Construct a model of the DUT/SUT that can be scaled to mimic the behavior of a larger scaled deployment of that physical DUT/SUT. The model may include a switching fabric component.
Tuning of the model may be performed to improve quality/fidelity of the emulation.
Scaled Emulation Performance Evaluation
Use DUT/SUT model to implement a larger-scaled DUT/SUT deployment emulation. The emulation may include a switching fabric component. The emulation may be implemented using performance evaluation system resources (e.g., network testing hardware, network testing servers, etc.)
Emulation is connected to the DUT/SUT in the physical testbed
Test case execution engine controls workload/workflow/memory pressure generator/workload emulator/traffic generators that generate external and/or internal messaging traffic during execution of a pre-defined test case. In some examples, external traffic may be provided by production/lab-based application servers. In other examples, the test system may host or emulate these application servers. Test case execution engine may control resource states (memory as a disaggregated component)
Monitor and report performance metrics associated with the physical DUT/SUT and/or the emulation. (*note: this may include switching fabric performance metrics, emulated DUT/SUT performance metrics, power consumption metrics, used to tune/planning tool for power consumption, etc.)

Figure 4:
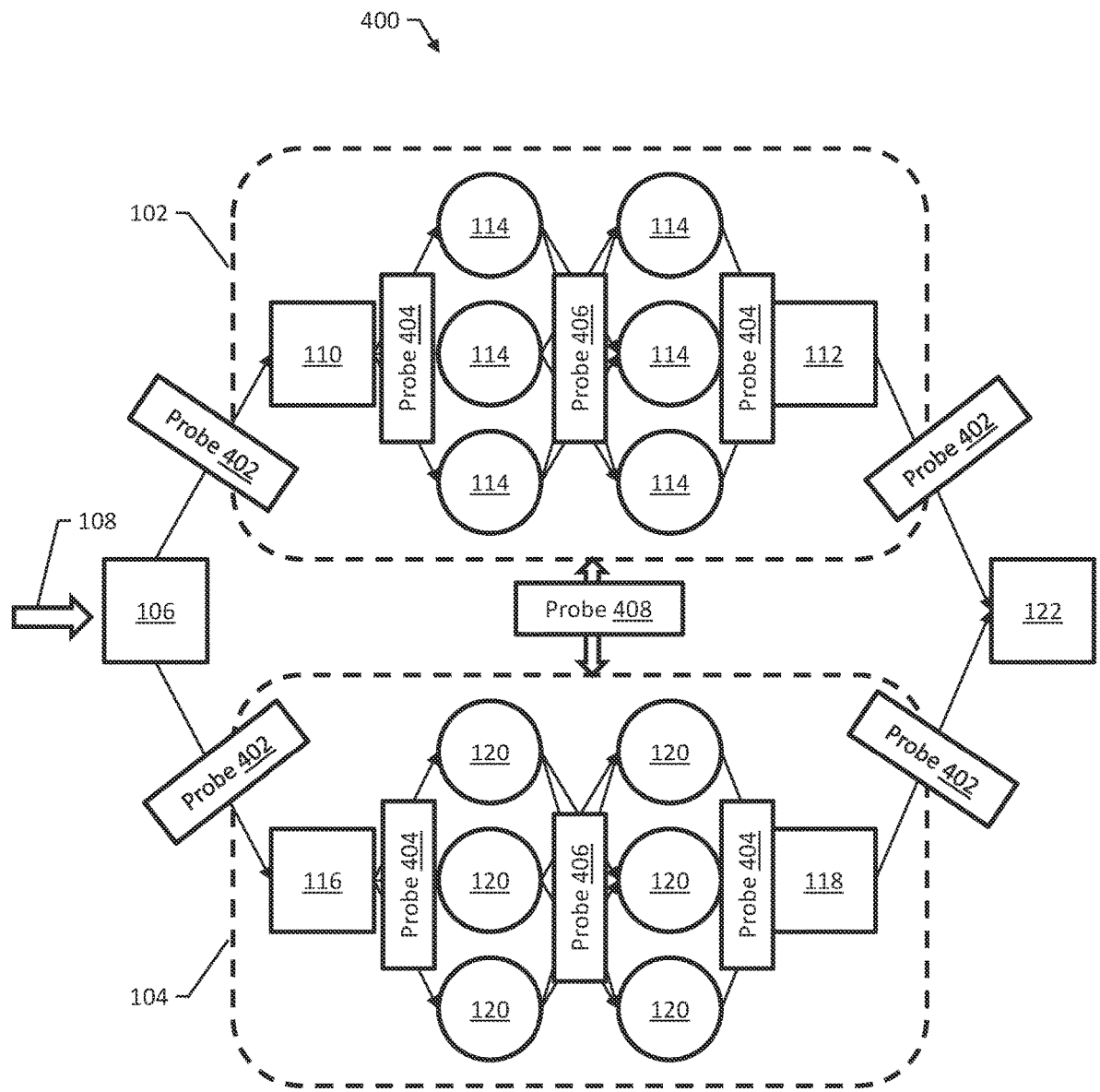
FIG. 4 is an example dataflow diagram that illustrates a processing node's collective all-to-all communications.

FIG. 4 is an example dataflow diagram that illustrates a processing node's collective all-to-all communications, as well as various monitoring points within the system under test (SUT) via monitoring agents, probes, and/or instrumentation within the benchmarks or workload itself. In this example, CPU and GPU processor resources within physical SUT are instrumented with monitoring agents or probes, which can collect and report CPU/GPU operational performance metrics, such transaction rates, data volume, memory access/utilization, etc. Messaging that is communicated between the various functional elements of the GPU node is also monitored via monitoring agents or probes.

As shown in FIG. 4, the system 400 includes a first GPU node 102, a second GPU node 104, a coordinator node 106 that receives a computing job 108, and another coordinator node 122. The first GPU node 102 includes an ingress CPU 110, a number of GPUs 114, and an egress CPU 112. The second GPU node 104 also includes an ingress CPU 116, a number of GPUs 120, and an egress CPU 118.

The system 400 includes a first set of probes 402 for monitoring the interfaces between the GPU nodes 102 and 104 and the coordinator nodes 106 and 122. The system 400 includes a second set of probes 404 for monitoring the interfaces between the ingress CPUs 110 and 116 and the GPUs 114 and 120. The system 400 includes a third set of probes 406 for monitoring the interfaces between the GPUs 114 and 120. The system 400 includes a fourth set of one or more probes 408 for monitoring the interfaces between the GPU nodes 102 and 104.

Each of the probes 402, 404, 406, and 408 is configured for monitoring messaging that is communicated between components of the system 400. Monitoring can include, for example, measuring communications statistics such as data transmission rate and burstiness, documenting application and protocol usage, and evaluating network traffic caused by common protocols. The workload 108 itself is subject to emit metadata about the workload and its communication patterns, and monitoring can include receiving and recording this metadata. The meta data can be useful, e.g., in conjunction with the other monitored data to build and tune models.

Figure 5:
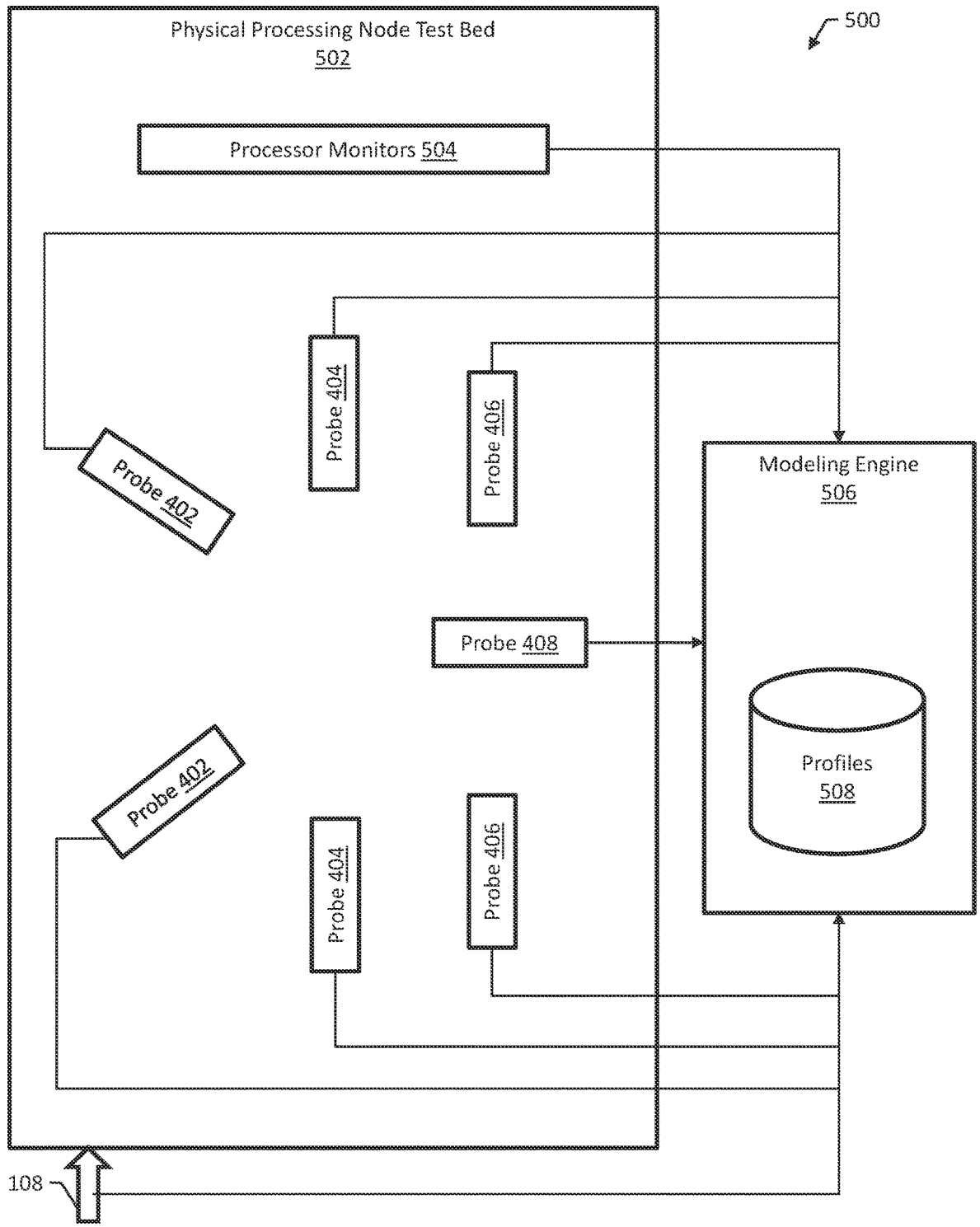
FIG. 5 is a block diagram of an example system 500 for constructing a compute resource model.

FIG. 5 is a block diagram of an example system 500 for constructing a compute resource model, i.e., a model of a physical processing node. The system 500 includes a physical processing node test bed 502 which can include the probes 402, 404, 406, and 408 and one or more monitoring agents 504 for collecting and reporting CPU/GPU operational performance metrics, such transaction rates, data volume, memory access/utilization, etc. The system 500 includes a modeling engine 506 configured for constructing single-node and multi-node profiles for physical processing nodes, which can be stored in a repository of profiles 508.

In operation, the modeling engine 506 receives data measured by the physical processing node test bed 502 and constructs the profiles using the measured data. The modeling engine 506 can optionally receive data from the computing job 108, e.g., by instrumenting a node that supplies the job 108 for execution by one or more processing nodes. The resulting profiles can be used by an emulation engine to emulate one or more physical processing nodes.

For example, consider the following:
Consider an AI training workload as a GPU app
These training workloads can execute on any appropriate AI training framework, such as PyTorch, and TensorFlow
The system can instrument PyTorch and TensorFlow kernels to tap communication collective events
The system can run a sample training workload for a particular AI model (say vision in MLPerf) on a single real GPU node, and gather the tapped events.
The system can generate dataflow graphs from these events
The system can then tune the dataflow's flow behaviors by comparing emulator generated dataflows vs. dataflows of real workload on the real GPU node.

Figure 6:
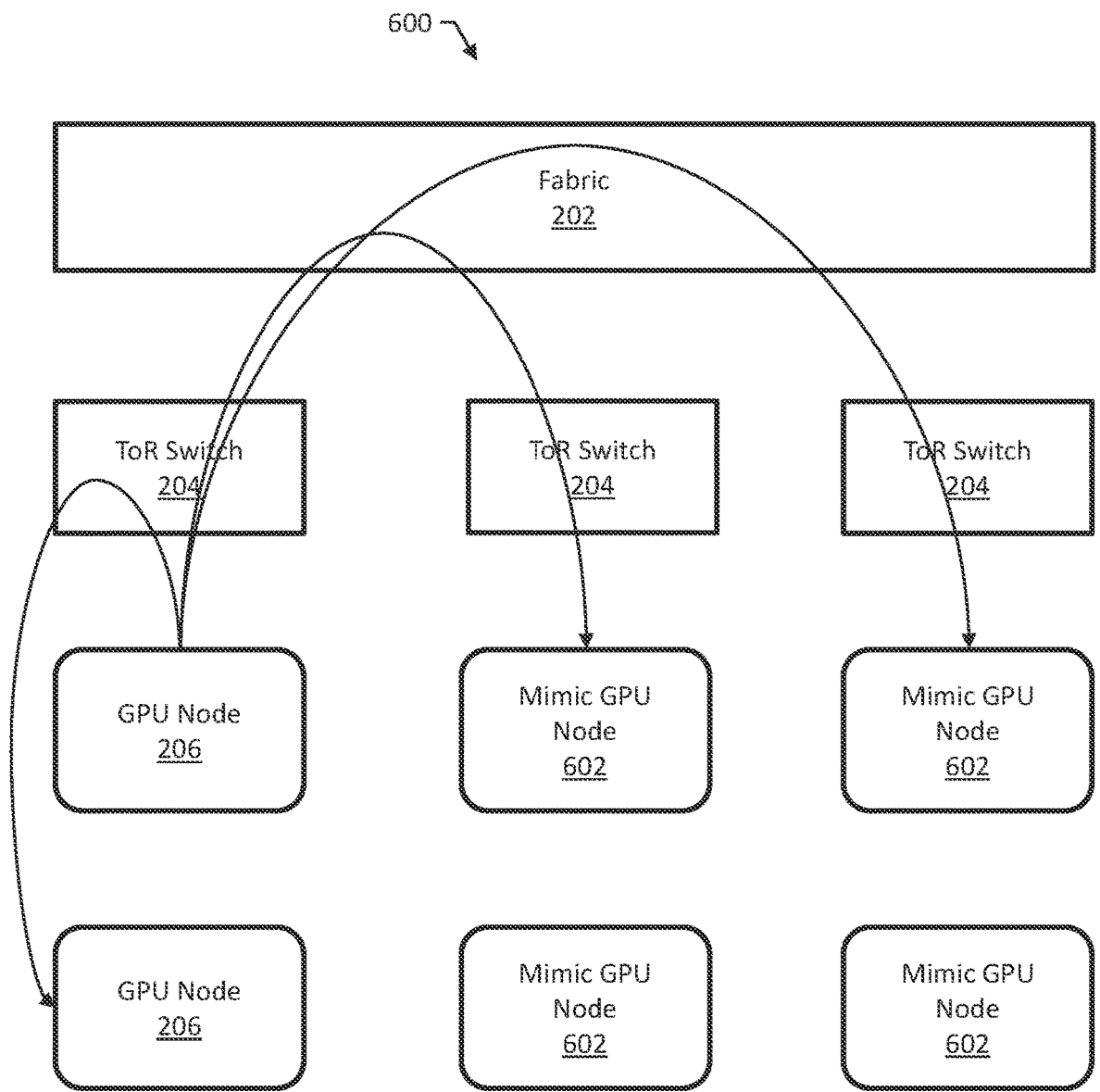
FIG. 6 is a block diagram of an example deployment of GPU nodes 206 within a testing environment.

FIG. 6 is a block diagram of an example deployment of GPU nodes 206 within a testing environment 600. The testing environment 600 includes a switching fabric 202 that enables inter-GPU node communications. Results of the GPU processing may be handled by/provided to the same internal CPU core and subsequently the same coordinator node.

As shown in FIG. 6, the GPUs communicate within racks (depicted as vertical columns in FIG. 6) by top of rack (ToR) switches 204. The ToR switches 204 can be used for communications within a rack or to communicate to other racks by way of the fabric 202. Inter-GPU node communications can be carried, e.g., on Ethernet or other appropriate data communications networks.

The testing environment 600 includes two physical GPU nodes 206 and four emulated GPU nodes 602. For example, the physical processing node emulation module 354 of FIG. 3B can be configured to emulate the emulated GPU nodes 602 using profiles.

Some or all of the emulated GPU nodes 602 are configured to perform, e.g., a hardware acceleration task such as machine learning training, which may result in the generation of inter- and intra-GPU node messaging. At least a portion of this traffic is directed towards the two physical GPU nodes 206 in the SUT via an inter-node communication interface.

In some examples, the two physical GPU nodes 206 in the SUT are instrumented with monitoring agents/probes. These monitoring agents/probes may observe and log various metrics associated with operation of the physical GPU nodes 206 during execution of the test. This logged performance data may then be analyzed by the test system and the results presented to the performance evaluation system operator.

In some examples, the switching fabric 202 may be similarly instrumented with monitoring agents/probes, such that performance of the switching fabric may be monitored, correlated with GPU node performance during execution of the test, and reported to the performance evaluation system operator.

Figure 7:
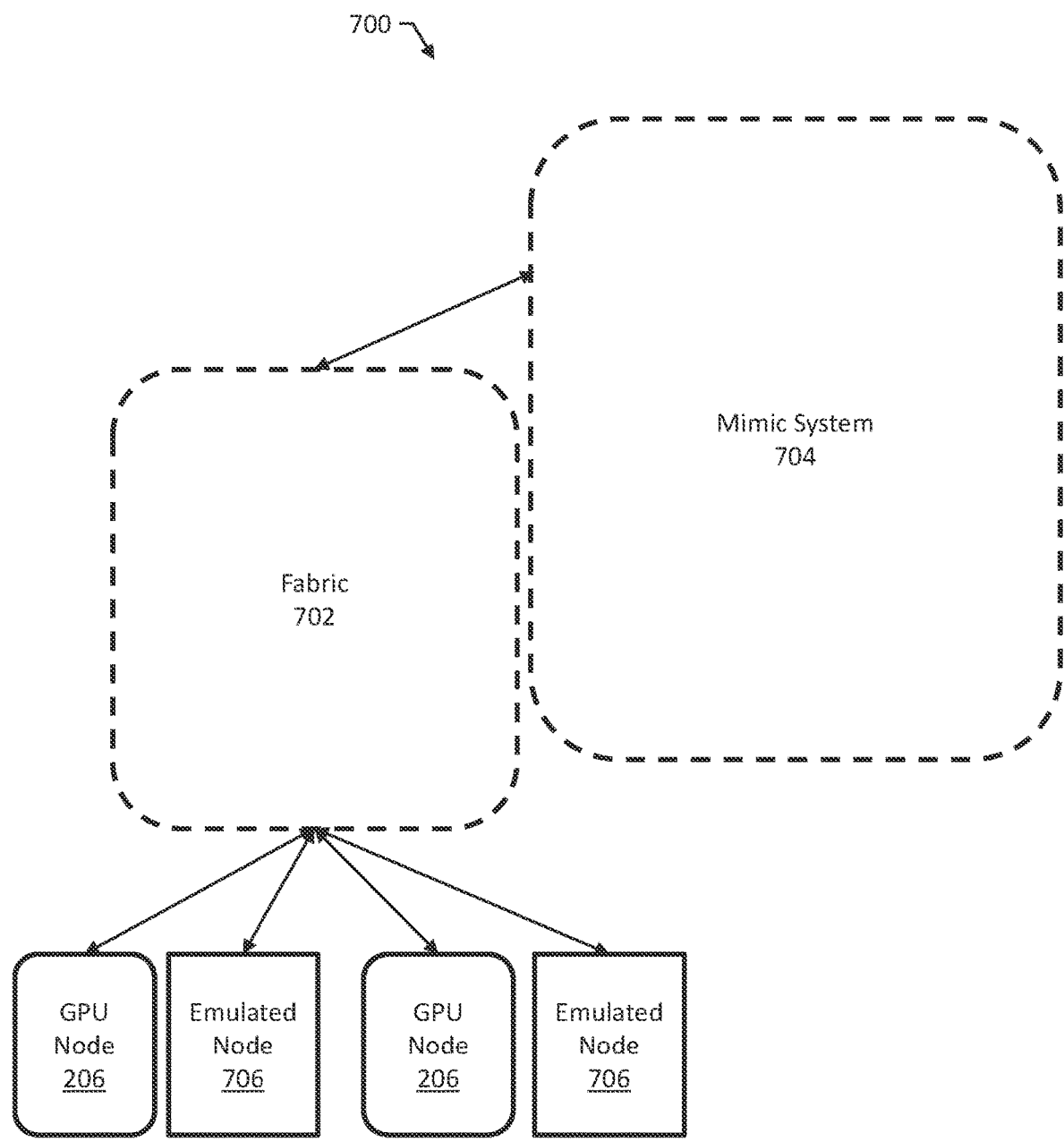
FIG. 7 is a block diagram of an example test configuration 700, which includes a SUT comprising two physical GPU nodes.

Each of the emulated GPU nodes 602 can include, for example:
A CPU/GPU compute+overhead model
    Data specifying internal interconnect delay
    Data specifying processing delay
    Data specifying coordination delay
    Data specifying stack overhead
One or more data flow generators that emit/receive network traffic through NICs
    Coordinated by central orchestrator
    Gaps in transmission taking into consideration of the compute+overhead model above FIG. 7 is a block diagram of an example test configuration 700, which includes a SUT comprising two physical GPU nodes 206. The test configuration 700 includes a switching fabric 702 and an emulated portion of the system 704.

In some examples, the switching fabric 702 is emulated by the performance evaluation system 350 (e.g., via use of a device comprising ASIC resources configured to emulate data center switching fabric.) Furthermore, in this example, the system 700 also includes an emulation component comprising emulated nodes 704 that effectively includes a hybrid GPU node+switching fabric model. These emulated nodes 704 include both a GPU emulation and portions of the switching fabric model that account for potentially emulated GPUs sitting in different points in the logical emulated fabric model, and may yield different latency timing due differing factors, such as attachment point. As such, this hybrid emulation is adapted to emulate both GPU nodes and the switching fabric 702. Some of the emulated GPU nodes 706 lack physical GPUs and use emulated models for GPUs and intra-node GPU communications.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A system for testing a system under test (SUT), the system comprising:
a distributed processing node emulator configured for:
emulating a mufti-processing node distributed computing system using a processing node communications model;
generating intra-processing node communications in the multi-processing node distributed computing system; and
generating inter-processing node communications in the multi-processing node distributed computing system, wherein at least a portion of the inter-processing node communications comprises one or more messages communicated with the SUT by way of a switching fabric;
a physical test bed configured to host a physical processing node, wherein the physical test bed comprises one or more external communications probes and one or more internal communications probes;
a characterization module configured for monitoring the physical processing node while the physical processing node is performing a computing task and building the processing node communications model based on a first plurality of data flows within the physical processing node; and
a test execution manager, implemented on at least one processor, and configured for managing the distributed processing node emulator to execute a pre-defined test case, monitoring the SUT, and outputting a test report based on monitoring the SUT during execution of the pre-defined test case.

2. The system of claim 1, comprising a switching fabric emulator configured for emulating the switching fabric.

3. The system of claim 1, wherein the characterization module is configured for building the processing node communications model based on a second plurality of data flows to one or more other physical processing nodes.

4. The system of claim 1, wherein the physical test bed comprises at least one power measurement probe for measuring power consumption by the physical processing node.

5. The system of claim 1, wherein monitoring the physical processing node comprises monitoring a performance metric comprising one or more of: power consumption, processor utilization, link utilization, switching queue utilization, memory utilization, response latency, switching latency, packet loss, packet misdirection rate, fabric congestion, processor congestion, and communication bus utilization.

6. The system of claim 5, wherein monitoring the SUT comprises monitoring the SUT for the performance metric, and wherein outputting the test report comprises outputting the performance metric.

7. The system of claim 1, wherein the SUT comprises a physical processing node including one or more of: a central processing unit (CPU), a graphical processing unit (GPU), a field programmable gate array (FPGA), and an application specific integrated circuit (ASIC).

8. The system of claim 1, wherein processing node communications profile specifies inter-processing node and intra-processing node communications by a processing node while the processing node is performing a machine learning training task, and wherein the processing node is a graphical processing unit (GPU) appliance comprising at least one central processing unit (CPU), a plurality of GPUs, and an internal communications bus.

9. A method for testing a system under test (SUT), the method comprising:
hosting by a physical test bed, a physical processing node, wherein the physical test bed comprises one or more external communications probes and one or more internal communications probes;
monitoring the physical processing node while the physical processing node is performing a computing task and building a processing node communications model based on a first plurality of data flows within the physical processing node;
emulating a multi-processing node distributed computing system using the processing node communications model;
generating intra-processing node communications in the multi-processing node distributed computing system;
generating inter-processing node communications in the multi-processing node distributed computing system, wherein at least a portion of the inter-processing node communications comprises one or more messages communicated with the SUT by way of a switching fabric;
executing a pre-defined test case in the multi-processing node distributed computing system;
monitoring the SUT; and
outputting a test report based on monitoring the SUT during execution of the pre-defined test case.

10. The method of claim 9, comprising emulating the switching fabric.

11. The method of claim 9, comprising building the processing node communications model based on a second plurality of data flows to one or more other physical processing nodes.

12. The method of claim 9, wherein the physical test bed comprises at least one power measurement probe for measuring power consumption by the physical processing node.

13. The method of claim 9, wherein monitoring the physical processing node comprises monitoring a performance metric comprising one or more of: power consumption, processor utilization, link utilization, switching queue utilization, memory utilization, response latency, switching latency, packet loss, packet misdirection rate, fabric congestion, processor congestion, and communication bus utilization.

14. The method of claim 13, wherein monitoring the SUT comprises monitoring the SUT for the performance metric, and wherein outputting the test report comprises outputting the performance metric.

15. The method of claim 9, wherein the SUT comprises a physical processing node including one or more of: a central processing unit (CPU), a graphical processing unit (GPU), a field programmable gate array (FPGA), and an application specific integrated circuit (ASIC).

16. The method of claim 9, wherein processing node communications profile specifies inter-processing node and intra-processing node communications by a processing node while the processing node is performing a machine learning training task, and wherein the processing node is a graphical processing unit (GPU) appliance comprising at least one central processing unit (CPU), a plurality of GPUs, and an internal communications bus.

* * * * *